(12) United States Patent
Wang et al.

(10) Patent No.: US 10,020,862 B2
(45) Date of Patent: Jul. 10, 2018

(54) WI-FI ADAPTIVE RECEIVER DIVERSITY

(71) Applicant: Apple Inc., Cupertino, CA (US)

(72) Inventors: Xiaowen Wang, Cupertino, CA (US);
Vinay R. Majjigi, Sunnyvale, CA (US);
Joonsuk Kim, Saratoga, CA (US);
Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 14/871,794

(22) Filed: Sep. 30, 2015

(65) Prior Publication Data

US 2016/0127028 A1 May 5, 2016

Related U.S. Application Data

(60) Provisional application No. 62/074,599, filed on Nov. 3, 2014.

(51) Int. Cl.
*H04B 7/08* (2006.01)
*H04B 17/12* (2015.01)
(Continued)

(52) U.S. Cl.
CPC ......... *H04B 7/0817* (2013.01); *H04B 7/0877* (2013.01); *H04B 17/12* (2015.01);
(Continued)

(58) Field of Classification Search
CPC .... H04B 7/0817; H04B 17/12; H04B 7/0877; H04B 17/318; H04B 7/0413; Y02B 60/50
See application file for complete search history.

(56) References Cited

U.S. PATENT DOCUMENTS 5,159,707 A   10/1992   Mogi et al.
5,369,801 A   11/1994   Smith
(Continued)

FOREIGN PATENT DOCUMENTS

EP   1093098 A1   4/2001
EP   1280230 A1   1/2003
(Continued)

OTHER PUBLICATIONS

Communication pursuant to Article 94(3) EPC, Application No. 15191807.5, dated Apr. 3, 2017, 8 pages.
(Continued)

*Primary Examiner* — David Oveissi
(74) *Attorney, Agent, or Firm* — Meyertons Hood Kivlin Kowert & Goetzel, P.C.; Jeffrey C. Hood

(57) ABSTRACT

Wireless communication devices with multiple receive (RX) chains may be operated to maintain high performance while saving power. This may be accomplished by evaluating signal strength during transmission of the RX packets, and/or evaluating a possible imbalance (gain difference) between the multiple RX chains within the wireless communication device. Signal strength (or good signal) detection may be enabled when non-MIMO (non-multiple-in-multiple-out) transmissions are taking place, while imbalance detection (antenna gain comparison) may be enabled when a specified number of single-stream packets have been received. Once the decision has been made to operate in a reduced number RX path mode, decision to reactivate one or more additional RX paths may be made based on MIMO detection, a detection of a drop in signal quality, and/or upon expiration of a power save timer.

20 Claims, 9 Drawing Sheets

(51) Int. Cl.
*H04B 17/318* (2015.01)
*H04B 7/0413* (2017.01)

(52) U.S. Cl.
CPC .......... *H04B 7/0413* (2013.01); *H04B 17/318* (2015.01); *Y02D 70/00* (2018.01); *Y02D 70/1262* (2018.01); *Y02D 70/1264* (2018.01); *Y02D 70/142* (2018.01); *Y02D 70/144* (2018.01); *Y02D 70/168* (2018.01); *Y02D 70/26* (2018.01); *Y02D 70/444* (2018.01)

(56) References Cited

U.S. PATENT DOCUMENTS

| | | | |
|---|---|---|---|
| 5,481,571 | A | 1/1996 | Balachandran et al. |
| 5,768,691 | A | 6/1998 | Matero et al. |
| 6,021,317 | A | 2/2000 | Irvin |
| 6,049,705 | A | 4/2000 | Xue |
| 6,115,367 | A | 9/2000 | Archambaud et al. |
| 6,339,400 | B1 | 1/2002 | Flint et al. |
| 6,560,443 | B1 | 5/2003 | Vaisanen et al. |
| 6,650,872 | B1 | 11/2003 | Karlsson |
| 6,760,362 | B2 * | 7/2004 | Patel ................ H04B 1/707 375/147 |
| 6,885,880 | B1 | 4/2005 | Ali |
| 7,155,178 | B2 | 12/2006 | Chang et al. |
| 7,239,889 | B2 | 7/2007 | Saari et al. |
| 7,271,769 | B2 | 9/2007 | Asano et al. |
| 7,302,244 | B2 | 11/2007 | Spencer et al. |
| 7,415,295 | B2 | 8/2008 | Tran |
| 7,676,202 | B2 | 3/2010 | Anton-Becker |
| 7,768,461 | B2 | 8/2010 | Cheng et al. |
| 8,150,454 | B2 | 4/2012 | Sanders |
| 8,792,575 | B2 | 7/2014 | Liu et al. |
| 9,070,974 | B2 | 6/2015 | Hu et al. |
| 9,083,074 | B2 | 7/2015 | Ayatollahi et al. |
| 2003/0073463 | A1 | 4/2003 | Shapira |
| 2004/0227674 | A1 | 11/2004 | Asano et al. |
| 2004/0257283 | A1 | 12/2004 | Asano et al. |
| 2004/0266374 | A1 | 12/2004 | Saed et al. |
| 2004/0266375 | A1 | 12/2004 | Li et al. |
| 2005/0053039 | A1 | 3/2005 | Dewan et al. |
| 2005/0064903 | A1 | 3/2005 | Uotsu et al. |
| 2005/0073462 | A1 | 4/2005 | Lin et al. |
| 2005/0135318 | A1 | 6/2005 | Walton et al. |
| 2005/0272384 | A1 | 12/2005 | Kogure |
| 2006/0001582 | A1 | 1/2006 | Hayashi |
| 2006/0109184 | A1 | 5/2006 | Chen et al. |
| 2006/0203709 | A1 | 9/2006 | Laroia et al. |
| 2006/0223476 | A1 | 10/2006 | Song et al. |
| 2007/0071149 | A1 | 3/2007 | Li et al. |
| 2007/0121537 | A1 | 5/2007 | Mullins et al. |
| 2007/0129034 | A1 | 6/2007 | Adams et al. |
| 2007/0218853 | A1 | 9/2007 | Yu |
| 2008/0018541 | A1 | 1/2008 | Pang et al. |
| 2008/0139153 | A1 | 6/2008 | Tuo et al. |
| 2008/0227498 | A1 | 9/2008 | Kwon et al. |
| 2008/0240260 | A1 | 10/2008 | Heidari et al. |
| 2008/0285530 | A1 | 11/2008 | Dietrich et al. |
| 2008/0316115 | A1 | 12/2008 | Hill et al. |
| 2009/0017767 | A1 | 1/2009 | Mashimo |
| 2009/0180429 | A1 | 7/2009 | Stevens et al. |
| 2009/0284354 | A1 | 11/2009 | Pinkham |
| 2010/0016023 | A1 | 1/2010 | Yamauchi et al. |
| 2010/0183099 | A1 | 7/2010 | Toda et al. |
| 2010/0210235 | A1 | 8/2010 | Ulupinar et al. |
| 2010/0220673 | A1 | 9/2010 | Hui et al. |
| 2010/0297959 | A1 | 11/2010 | Newton et al. |
| 2011/0026420 | A1 * | 2/2011 | Zhang ................ H04L 1/0001 370/252 |
| 2011/0269498 | A1 | 11/2011 | Li et al. |
| 2012/0057621 | A1 | 3/2012 | Hong et al. |
| 2012/0082257 | A1 | 4/2012 | Kent et al. |
| 2012/0122407 | A1 | 5/2012 | Allpress et al. |
| 2012/0148057 | A1 | 6/2012 | Beerends et al. |
| 2013/0222515 | A1 | 8/2013 | Abuan et al. |
| 2013/0237294 | A1 | 9/2013 | Periyalwar et al. |
| 2013/0242772 | A1 * | 9/2013 | Attar ................ H04B 7/0871 370/252 |
| 2013/0288624 | A1 | 10/2013 | Mujtaba et al. |
| 2013/0308478 | A1 | 11/2013 | He et al. |
| 2013/0308608 | A1 | 11/2013 | Hu et al. |
| 2014/0162566 | A1 | 6/2014 | Desclos et al. |
| 2015/0282057 | A1 * | 10/2015 | Li ................ H04B 7/0871 455/552.1 |

FOREIGN PATENT DOCUMENTS

| | | |
|---|---|---|
| EP | 1995889 A1 | 11/2008 |
| WO | 2001005088 A1 | 1/2001 |
| WO | 2001059945 A1 | 8/2001 |
| WO | 03096474 A1 | 11/2003 |
| WO | 2004047309 A2 | 6/2004 |
| WO | 2004102744 A1 | 11/2004 |
| WO | 2008055039 A2 | 5/2008 |
| WO | 2010025023 A2 | 3/2010 |
| WO | 2014071586 A1 | 5/2014 |

OTHER PUBLICATIONS

Extended European Search Report, Application No. 15191807.5, dated Dec. 11, 2015, 10 pages.

Office Action, Japanese Application No. 2014524078, dated Jan. 6, 2015, 5 pages.

Office Action, Korean Patent Application No. 1020147002894, dated Dec. 8, 2014, 11 pages.

* cited by examiner

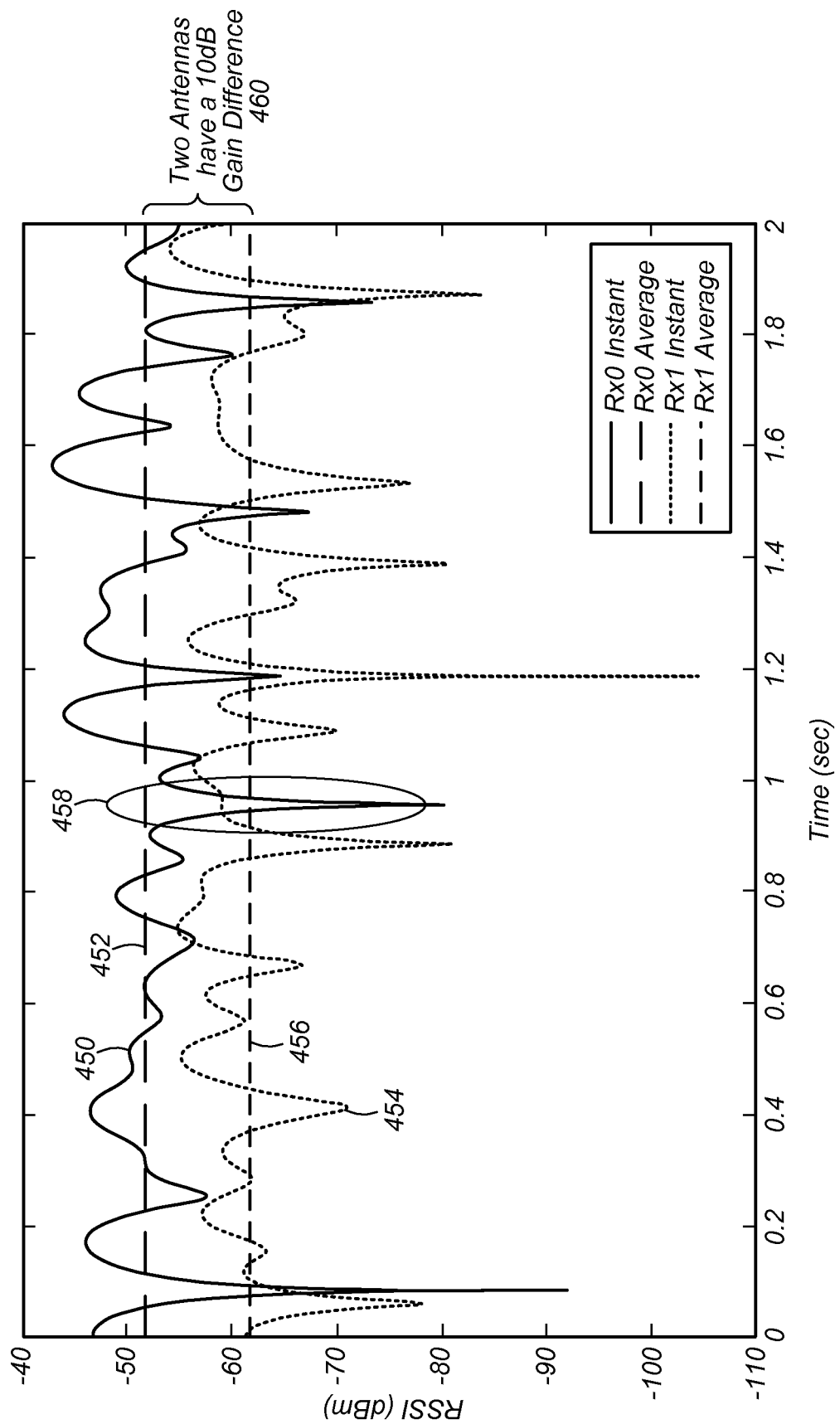

WI-FI ADAPTIVE RECEIVER DIVERSITY

PRIORITY CLAIM

This application claims benefit of priority of U.S. Provisional Patent Application Ser. No. 62/074,599 titled "WiFi Adaptive Receiver Diversity and Transmit Antenna Selection", filed on Nov. 3, 2014, which is hereby incorporated by reference as though fully and completely set forth herein.

FIELD OF THE INVENTION

The present application relates to wireless communications, and more particularly to techniques for adaptive receiver diversity in a wireless communication device.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the "Wi-Fi" brand name. WLAN networks link one or more devices to a wireless access point, which in turn provides connectivity to the wider area Internet.

In 802.11 systems, devices that wirelessly connect to each other are referred to as "stations". Wireless stations can be either wireless access points (AP) or wireless clients (or client devices). Access points (APs), which are also referred to as wireless routers, act as base stations for the wireless network. APs transmit and receive radio frequency signals for communication with wireless client devices, which may include a variety of different wireless communication devices, including portable devices, wearable devices, stationary devices and the like. APs can also typically couple to the Internet in a wired fashion. As noted above, wireless clients or wireless client devices operating on an 802.11 network can be any of various devices such as laptops, tablet devices, smart phones, or fixed devices such as desktop computers. Wireless client devices are also referred to herein as user equipment (or UE for short). Some wireless client devices are also collectively referred to herein as mobile devices (although, as noted above, wireless client devices overall may be stationary devices as well).

In cellular and Wi-Fi systems, UEs sometimes have two receiver chains and one or more transmit chains. The two receiver chains can be used together to improve the receiver performance, but oftentimes at the expense of using more power. In addition, UEs may also have two (or more) antennas used for receiver diversity. However, further improvements are needed to enable a UE to make better decisions regarding use of single or multiple receiver chains and/or multiple transmitter chains, and use of single and/or multiple antennas.

SUMMARY OF THE INVENTION

Embodiments described herein relate to wireless communications, and determining whether to use one or more receiver chains and/or transmitter chains in wireless communication systems, such as Wi-Fi systems.

In one set of embodiments, a UE includes multiple antennas, multiple radios, and one or more processors coupled to the radios. At least one radio of the multiple radios performs Wi-Fi communications. The UE may perform voice and/or data communications, as well as the methods described herein.

In some embodiments, UEs with multiple receive (RX) chains co-located with one or more transmit (TX) chains may be operated to maintain high performance while also saving power. This may be accomplished by evaluating signal strength during transmission of the RX packets, and/or evaluating a possible imbalance (gain difference) between the multiple RX chains within the UE. Signal strength (or good signal) detection may be enabled when non-MIMO (non-multiple-input-multiple-output) transmissions are taking place, while imbalance detection (antenna gain comparison) may be enabled when a specified number of single-stream packets have been received. Once the decision has been made to operate in a single (or more generally a reduced number) RX path mode, the decision to reactivate or turn back on one or more additional RX paths may be made based on MIMO detection, a detection of a drop in signal quality, and/or upon expiration of a power save timer. In this context, reactivating an RX chain/path or turning an RX chain/path back on refers to using the RX path for receiving and processing a received signal.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 7 shows an exemplary diagram illustrating received signal strength indication (RSSI) for two antennas, according to some embodiments;

Figure 1:
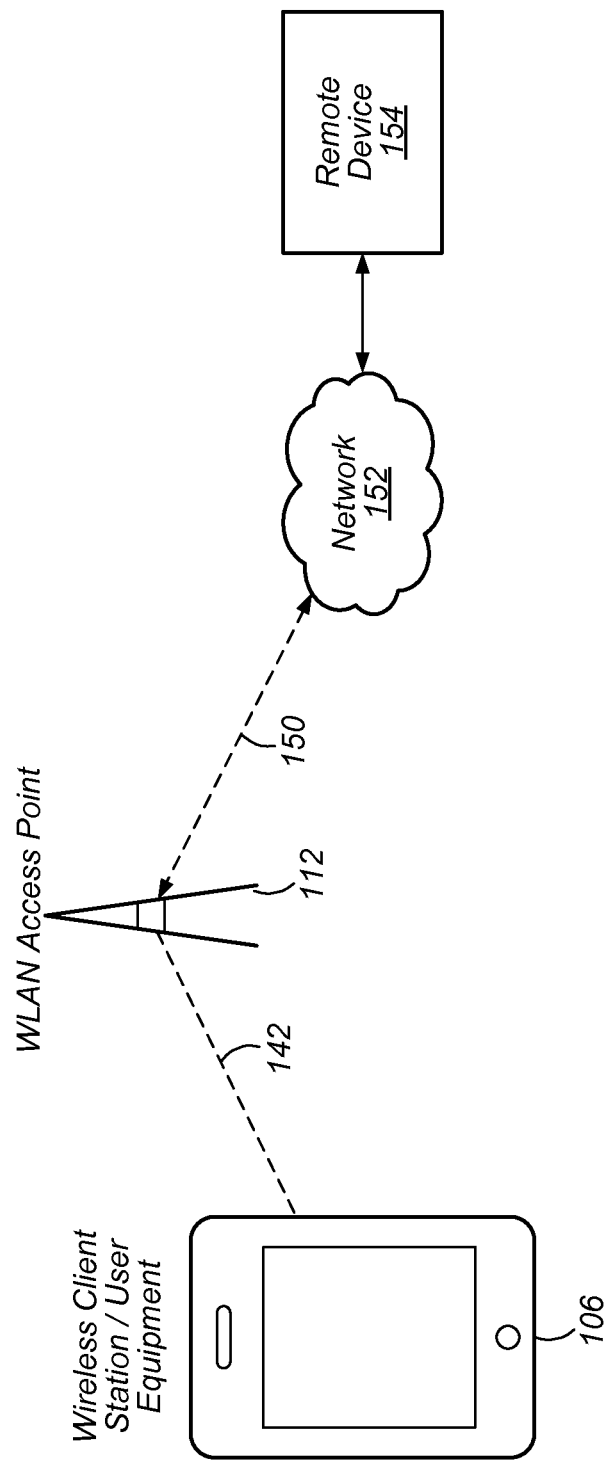
FIG. 1 illustrates an exemplary WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device—any of various types of computer systems devices which performs wireless communications using WLAN communications. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE).

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Wi-Fi—The term "Wi-Fi" has the full breadth of its ordinary meaning, and at least includes a wireless communication network or radio access technology (RAT) that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Exemplary WLAN System

FIG. 1 illustrates one example of a WLAN system according to some embodiments. As shown, the exemplary WLAN system includes a wireless client station, or use equipment (UE) 106 communicating over a wireless communication channel 142 with an Access Point (AP) 112. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards, for example.

Figure 2:
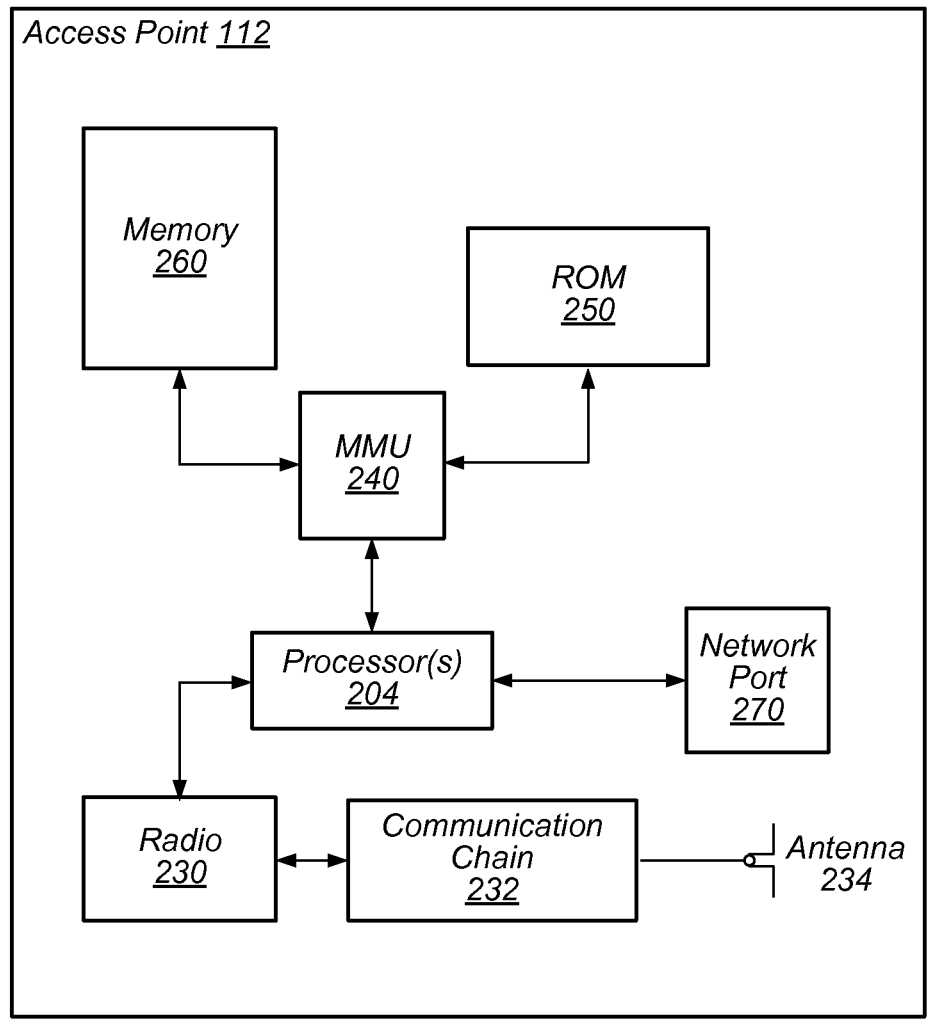
FIG. 2 illustrates a simplified block diagram of an exemplary WLAN Access Point (AP), according to some embodiments.

FIG. 2—Block Diagram of an Exemplary Access Point

FIG. 2 shows a block diagram of an exemplary Access Point (AP) 112. It is noted that the block diagram of AP 112 of FIG. 2 is merely one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example port 270 may be an Ethernet port. The local network may provide connectivity to additional networks, such as the Internet. The AP 112 may include at least one antenna 234, which may operate as a wireless transceiver and may communicate with mobile device 106 via wireless communication circuitry (also referred to as radio) 230. AP 112 may use antenna 234 to communicate with the wireless communication circuitry 230 via communication chain 232. For example, AP 112 may use antenna 234 to receive signals, and relay the received signals to radio 230 via communication chain 232. Similarly, AP 112 may use antenna 234 to transmit signals provided to antenna 234 from radio 230 via communication chain 232. Accordingly, communication chain 232 may comprise one or more receive (RX) chains, one or more transmit (TX) chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, and the like. for example when the AP 112 is co-located with a base station in case of a small cell, or in other instances when it may be desirable for the AP 112 to communicate via various different wireless communication technologies.

The processor(s) 204 of the AP 112 may be configured to implement part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Furthermore, processor(s) 204 may be a processing element as described in the Terminology section above.

Figure 3:
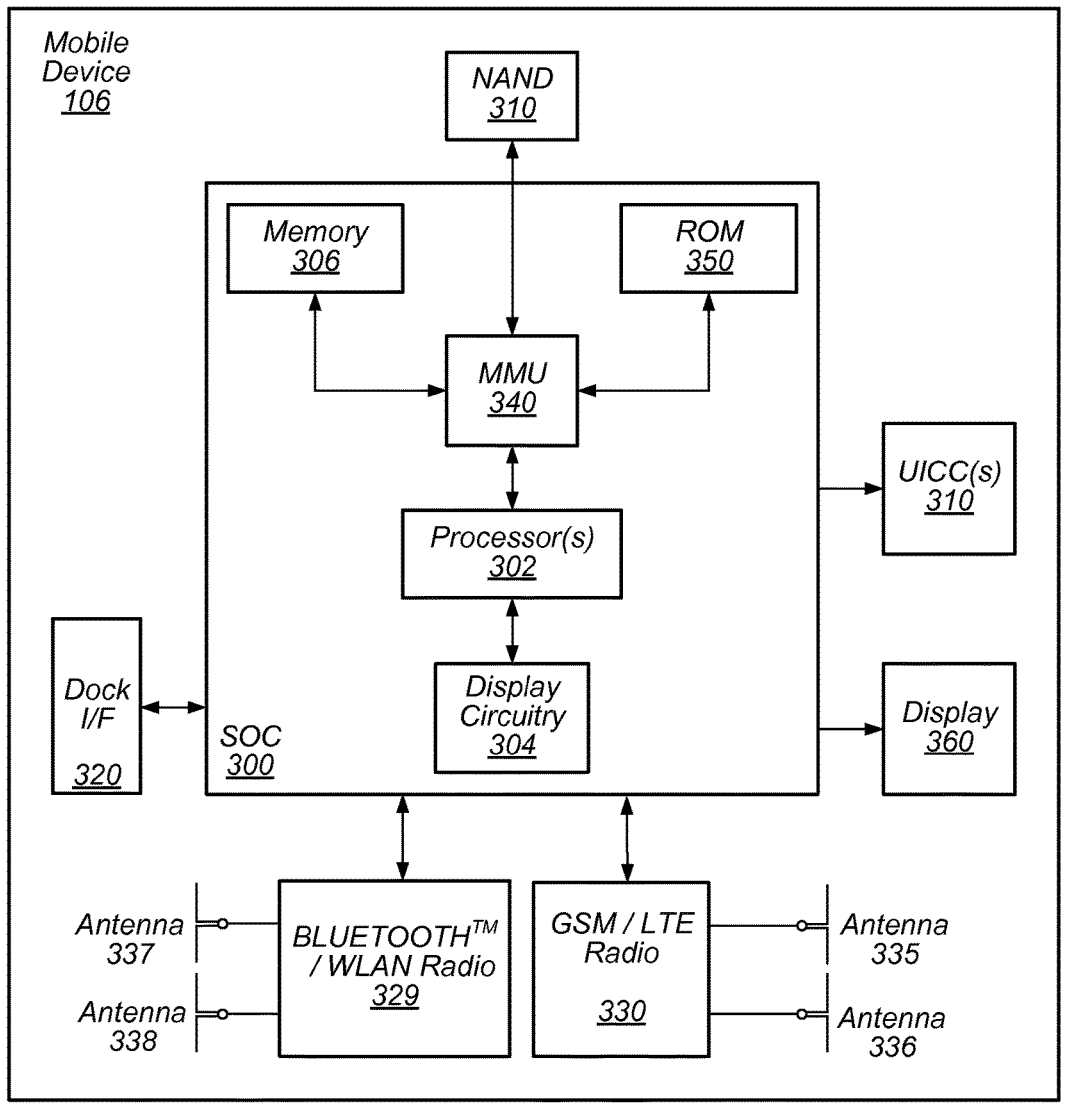
FIG. 3 illustrates a simplified block diagram of an exemplary mobile device (UE), according to some embodiments.

FIG. 3—Block Diagram of an exemplary Client Station

FIG. 3 illustrates the simplified block diagram of an exemplary UE 106, according to some embodiments. As shown in FIG. 3, the UE 106 may include a system on chip (SOC) 300, which may include portions for various purposes. The SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, cellular communication circuitry 330 such as for LTE, GSM, etc., and short range wireless communication circuitry 329 (e.g., BLUETOOTH™ and WLAN circuitry). The UE 106 may further include one or more smart cards 310 that may have SIM (Subscriber Identity Module) functionality, such as one or more UICC(s) (Universal Integrated Circuit Card (s)) cards 310. The cellular communication circuitry 330 may couple to one or more antennas, such as antennas 335 and 336 as shown. The short range wireless communication circuitry 329 may also couple to one or more antennas, such as antennas 337 and 338 as shown. Alternatively, the short range wireless communication circuitry 329 may couple to the antennas 335 and 336 in addition to, or instead of, coupling to the antennas 337 and 338. The short range wireless communication circuitry 329 may comprise multiple RX chains and/or multiple TX chains for receiving and/or transmitting multiple spatial streams, such as in a multiple-input multiple output (MIMO) configuration.

As shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the UE 106 may be configured to communicate wirelessly using one or more radio access technologies (RATs). The UE 106 may be configured to communicate according to a WLAN RAT for communication in a WLAN network, such as that shown in FIG. 1, for example. The UE 106 may also be configured to communicate on other RATs, such as cellular RATs, as desired.

As described herein, the UE 106 may include hardware and software components for implementing the features described herein. For example, the processor(s) 302 of the UE 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit), or a combination thereof. In general, processor(s) 302 may be a processing element(s) as described in the Terminology section above. Alternatively (or in addition), processor(s) 302 of the UE 106, in conjunction with one or more of the other components 300, 304, 306, 310, 320, 330, 335, 340, 350, 360 may be configured to implement part or all of the features described herein. Accordingly, the UE 106 may implement switching between a "single RX chain mode of operation" and a "multiple RX chains mode of operation", and may further implement switching between antennas, e.g. switching between antennas 337 and 338. In some embodiments, short range wireless communication circuitry 329 may include one or more TX chains and/or one or more RX chains coupled to antennas 337 and 338.

As used herein, the term "UE" may refer to a device such as the UE 106 described above.

Wi-Fi Adaptive Receiver Diversity

Figure 4:
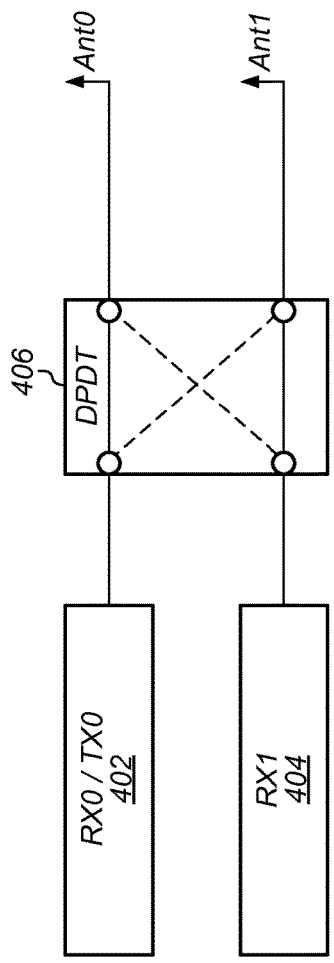
FIG. 4 illustrates an exemplary transceiver configuration that includes a control system for switching between antennas, according to some embodiments.

FIG. 4: Example of Multiple Receiver Chains

FIG. 4 illustrates an exemplary UE with multiple receiver chains, including a first receiver chain referred to as RX0 and a second receiver chain referred to as RX1. The UE may also include at least one transmitter chain referred to as TX0. As shown, RX0 and TX0 may share the same communication path 402, while RX1 may represent a single communication path 404. As shown, RX0/TX0 402 is coupled to one input of a Double Pole Double Throw (DPDT) switch 406. RX1 404 is coupled to the other input of the DPDT switch 406. A first output of the DPDT switch 406 is coupled to antenna 0 (Ant 0), and a second output of the DPDT switch is coupled to antenna 1 (Ant 1).

In one scenario, the two receiver chains RX0 and RX1 may be used together (simultaneously) to improve the receiver performance, at the expense of consuming more power. In another scenario, only one of the receiver chains (e.g., either RX0 or RX1) may be turned on, and the other receiver chain (e.g., RX1 or RX0, respectively) may be turned off. This may occur, for example, when it is determined that the additional receive antenna would not help much in terms of reception ability, and thus one of the RX chains may be turned off to save power. In other words, under certain conditions it may be desirable to maintain performance while also saving power, and it may not be necessary to simultaneously operate the two RX chains to receive a beacon signal from the AP. While the simultaneous operation of the two antennas/receivers provides the capability to extend the signal range, such may not necessarily be a requirement. If the signal strength is good enough to sustain one RX chain (or a single RX chain) to receive a beacon signal, for example, then there may be no need to operate two (or more) RX chains simultaneously. For example, a legacy AP that doesn't support MIMO (Multiple Input Multiple Output) mode may always transmit single stream packets. When in close proximity to such an AP, signal strength may be good enough, therefore it may not be necessary or especially advantageous to operate multiple RX chains and antennas. If one of the antennas becomes significantly compromised, for example by being in close proximity to (or covered up) by a communications hand, then it may be desirable to turn off (or disengage) that antenna. In the above cases, one of the RX chains may be turned off without sacrificing performance, and thereby save power. It should be noted that unlike for MIMO transmissions, it is not necessary to simultaneously operate two (or more) RX chains when receiving single stream packet transmissions. While in such cases the simultaneous operation of two (or more) RX chains may improve performance, such simultaneous operation is not necessary. It should also be noted that while exemplary embodiments disclosed herein show two RX chains, alternate embodiments may include more than two RX chains and more than two antennas, similarly configured to be operated as described above.

When the UE device is in a power save state, i.e., when the UE device periodically wakes up to receive a beacon from the AP (such as AP 112, for example) which is always transmitted in single stream, it may be sufficient to operate one RX chain for beacon reception. When the UE device is in a continuous receive state, i.e., when the UE device receiver is always turned on (or engaged) in order to be prepared for data transmission and/or reception, the opportunity for power savings is reduced, and both (or possibly more, in case of more than two) RX chains are normally turned on. However, in a network that does not support MIMO, (as mentioned above), when a signal is strong, one RX chain can achieve a peak receiver rate, and thus the second RX chain (or, in general, any one or more additional RX chains) may be turned off. As another example, one antenna may be significantly compromised, e.g., when a user's hand is gripping the UE casing in such a way as to compromise or detract from the performance of one of the antennas. In such a case the RX chain corresponding to (or associated with) the compromised antenna may be turned off.

Figure 5:
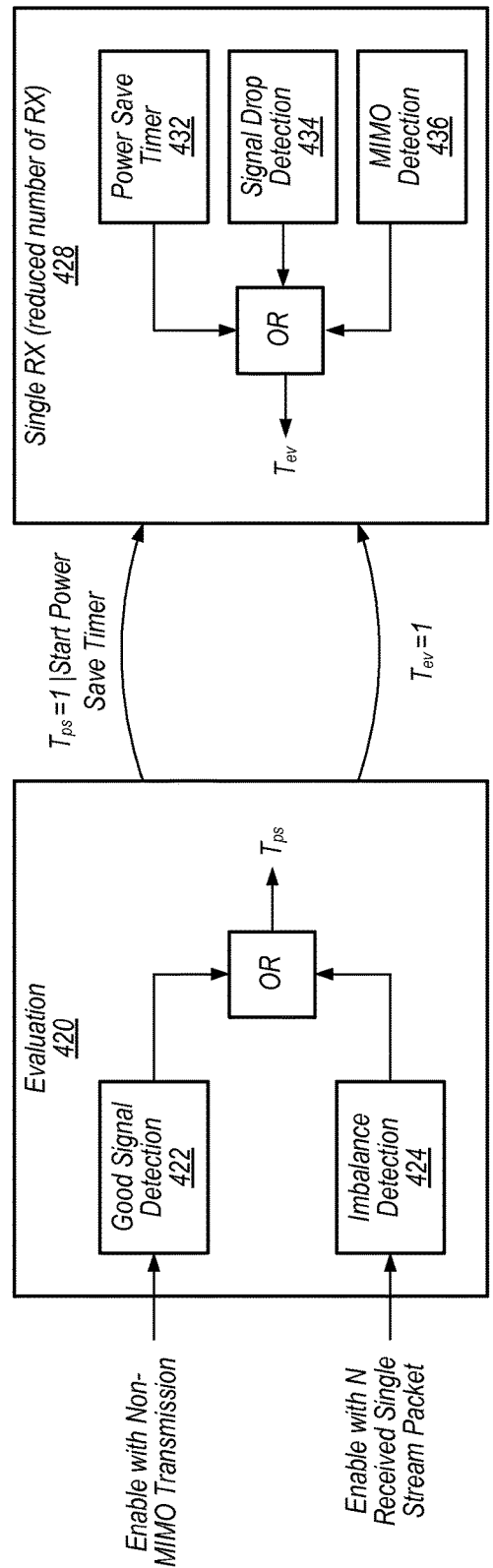
FIG. 5 illustrates an exemplary control system for switching between a single/reduced number receive chain mode of operation and a multiple receive chain mode of operation, according to some embodiments.

FIG. 5: Determining Single or Multiple Receiver Chains

FIG. 5 shows a block diagram illustrating how to adaptively or dynamically determine when to utilize multiple receiver (RX) chains vs. a single RX chain, according to some embodiments. As shown in FIG. 5, on the left hand side in the evaluation state 420, the UE is operating with multiple RX chains. In one set of embodiments, there may be two RX chains. Alternatively or in addition, there may be more than two RX chains. The UE may enter the evaluation state 420 to evaluate whether use of one of the RX chains is to be discontinued, e.g., whether to drop down to using only a single RX chain. In other words, while operating in the evaluation state 420, both RX chains may be turned on, and the UE evaluates whether to turn one RX chain off, and if so, which RX chain. The evaluation may include imbalance detection 424, which may perform antenna gain comparison and evaluation to determine if one of the antennas is operating in a compromised state, or in a lower gain state than the other antenna. The evaluation may further include signal strength detection, or good signal detection 422 as will be further described below. As also shown in FIG. 5, the UE may enter the evaluation state 420 when either (or all) of a number of conditions ascertained during the course of the aforementioned evaluations are true.

As mentioned above, when operating in the evaluation state 420, the UE may perform good signal detection, that is, it may track signal strength (such as a received signal strength indication, RSSI) and/or received signal to noise ratio (SNR) for each RX chain separately, e.g. when not operating in a MIMO network. In such cases, the UE may determine if it is receiving a good signal. Since during operation on a non-MIMO network the UE is not operating (not enabling or not engaging) both RX chains, the UE may perform a check to determine if the received signal strength and/or received SNR are of at least some expected value(s). Responsive to that determination, the UE may further determine whether one or more of the RX chains may be disabled, e.g. switched off. The AP beacon can carry all rates that are supported by the AP, hence the UE device is aware of whether MIMO operation is supported or not. When tracking received signal strength, the UE may only consider signals received from an associated AP (or the associated device with which the UE is in communication). For the sake of simplicity and for the purposes of illustration, in the example provided herein, communication of the UE is with an associated AP. The UE thus monitors whether packets are successfully received from that AP.

It should also be noted regarding single stream operation and MIMO operation that either the AP has been explicitly instructed, or the UE has been explicitly instructed that MIMO operation is not supported and/or used. An implicit determination may be made from the AP adapting to single stream from multiple streams due to certain conditions. For example, the observance of single stream packets from the AP over a period of time may be interpreted by a UE as lack of support for MIMO (whether long term or temporary), and the UE may therefore expect single stream packets as opposed to multiple streams of packets in the foreseeable future.

If the UE device is in a power save state (receiving a beacon signal only) or the network does not support MIMO, the RSSI/SNR of beacon frames transmitted by the associated AP may be used for filtering (to determine whether to switch from multiple RX chain mode to single RX chain mode) as absolute signal strength may be needed to assess signal reception. For example, an IIR (infinite impulse response) filter may be used with filter coefficients adapted to the interval between two successful beacon receptions. One RX chain may be switched off if the RSSI/SNR of any RX chain is larger than a specified threshold value. For example, the RX chain with the smaller antenna gain may be switched off, where the gain determination may be based on the results of the imbalance detection 424, as will be further discussed below. The threshold of the filter output may be related to the highest supported rate and may also be adapted to the interval between successful beacon receptions. For example, if the beacon rate with a single antenna is 1 Mbps (megabits per second), then exemplary threshold values may be defined as RSSI>−85 dBm and SNR>0 dB. At the highest 802.11n rate with 1 antenna (MCS 7), exemplary threshold values may be defined as RSSI>−50 dBm and SNR>28 dB. In other words, for the filter (signal strength evaluation as part of good signal detection 422) in power save mode, the threshold may be based on the beacon rate.

When the UE is in the evaluation state 420, it may perform imbalance detection 424 upon having received N single stream packets. Overall, the imbalance detection 424 may be enabled with single stream transmission. This may occur when the network only supports single stream transmission, or N previously received packets from the associated link (e.g. from an AP) are all single stream packets. The imbalance antenna may operate to gauge the antenna gain difference. In measuring the antenna gain difference, the measurements may be performed on all received packets, not just the beacon from the associated AP. In one embodiment, the RSSI/SNR difference between different antennas may be filtered with an IIR filter with coefficients adapted to the interval between two successfully received packets. The absolute value of the filter output may be compared to a specified threshold value, and the antenna (and consequently also the corresponding RX chain) with the lower gain may be switched off or (temporarily) disabled or disengaged until further action is taken to re-enable (engage) the antenna and the corresponding RX chain. The specified threshold may be adapted to the interval between two successfully received packets and may also be adapted to the RSSI/SNR of the packet destined for the device. One example of a threshold value in this case is 15 dB.

If evaluation 420 results in determining either that there is good signal detection (on a non-MIMO network) or that there is detection of an imbalance in N received single stream packets, then the UE may transition to the single RX chain state (or mode of operation) 428, where only a single RX chain is used, or more generally where a reduced number of RX chains are used.

When the UE transitions to the single RX (or more generally the reduced number of RX) state 428, in which at least one RX chain is switched off as a result of evaluation 420 (indicated in FIG. 5 with $T_{ev}$=1), a power save timer ($T_{ps}$) may be started. The power save timer ($T_{ps}$) may count a length of time (or time duration) during which power save operation is performed, i.e., a length of time during which (at least) one of the RX chains is turned off/disabled. Once the power save timer ($T_{ps}$) has expired, that is, once it has counted down to 0, it may trigger the UE to leave the Single RX state 428 (in which only a single RX chain is enabled) and transition back to the evaluation state 420 (where multiple RX chains are enabled). Thus, in some embodiments, when (at least) one RX chain is switched off, a timer (power save timer $T_{ps}$) may be started. The duration of the timer may be any of various values, e.g., 10 s. Upon timer expiration, both (or all) RX chains may be turned on (engaged/enabled) for another step of evaluation 420.

The timer value or expiration could also be based on other information, e.g., motion of the UE. For example, when the UE is undergoing greater motion, the length of the timer may be reduced so that the UE spends less time in the single RX chain state. This may be beneficial as the motion of the UE introduces greater reception difficulties, and the UE would therefore likely benefit from reducing the time period during which it is operating with only a single enabled receiver. When the UE is undergoing less or no motion, the length of the timer may be increased so that the UE operates in the single (reduced) RX chain state 428 for a greater time duration (i.e. for a longer time period). Other conditions that may cause the UE to leave the single RX chain state 428 and transition back to the evaluation state 420 (i.e. multiple RX chain state) may include detection of a signal drop or detection of MIMO operations. In order to perform the signal drop detection, a good signal filter may operate on the operating receiver chain to detect a signal drop. If the signal filter output is lower than a specified threshold value, then both (or more, if available and deemed beneficial to enable) RX chains may be turned on/enabled regardless of the timer value. Examples of these thresholds include RSSI<−60 dBm and/or SNR<20 dB.

That is, in Single RX chain mode 428, upon expiration of the power save timer, both (or one or more additional) RX chains may be turned on in order to perform the evaluation 420. That is, the presently operational RX chain may be turned back on or enabled within a specified period of time to again perform the evaluation on the two (or multiple) RX chains. Signal strength is monitored (434) in the single RX stage 428 to ascertain whether signal reception is strong enough. For example, if a large signal drop is observed (i.e. the signal is deteriorating) on the presently operating RX chain, then the other antenna may be turned on to compensate for the signal strength drop.

It should also be noted that upon transitioning to single RX chain mode (or state) 428, the AP may be explicitly instructed that presently only single stream transmissions are being supported. However, such signaling may be somewhat problematic, as it may need to be dissociated from the network, then re-associated with the network, which may not be very efficient. An alternative to such notification, following transition to the single RX chain mode 428, may be to provide MIMO detection 436. Even in single RX mode 428 the signal field of a MIMO transmission may be decoded, since AP may indicate in the signal field when the packets are transmitted in MIMO. Upon detecting such an indication of MIMO transmissions, transition may be made back to dual RX mode 420. While an initial packet may be lost in such cases, it does provide means to maximize performance while saving power. To put it another way, when imbalance detection 424 triggers a transition to a single (or reduced) RX state 428, the UE may either transmit explicit signaling to the AP to indicate that the UE now supports SISO (single input single output) only transmission. In case such signaling is implemented, MIMO detection 436 may not be necessary. On the other hand, MIMO detection 436 may be performed whereby a received HT (high throughput) signal field may indicate a MIMO transmission.

When any one or more of the conditions (power save timer 432 elapses, signal drop detection 434 indicates dropped signal, MIMO detection 436 indicates MIMO transmissions), the UE may transition from use of a single RX chain (428) to using a plurality of RX chains (420). It should be noted that imbalance detection 424 and MIMO detection 436 are applicable in a continuous receive (RX) state.

Figure 6:
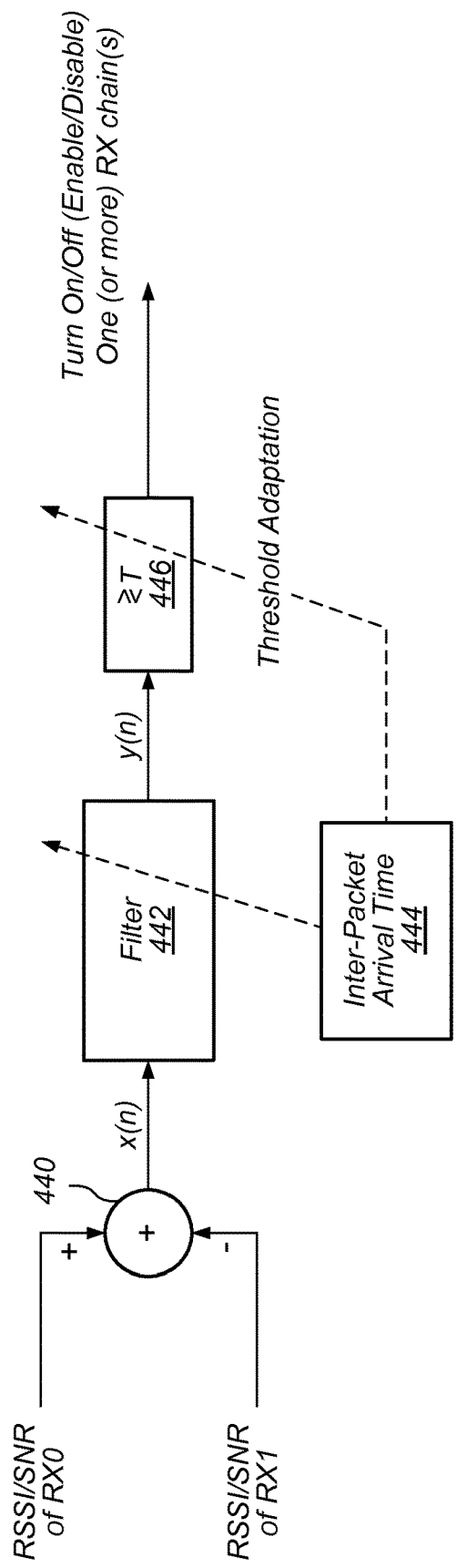
FIG. 6 illustrates an exemplary filter adaptation system for antenna imbalance evaluation, according to some embodiments.

FIG. 6—Filter Adaptation

FIG. 6 illustrates filter adaptation, according to some embodiments, whereby the imbalance between RX chains (or between respective antennas associated with or corresponding to the RX chains) is determined. As shown in FIG. 6, the RSSI/SNR of RX0 and the RSSI/SNR of RX1 may be input to a node 440 whose output x(n)—representative of a difference between the RSSI/SNR of RX0 and the RSSI/SNR of RX1—is provided to a filter 442. The filter 442 outputs a value y(n) provided to a comparator 446. The comparator 446 compares the value y(n) to a threshold value T. The result of this comparison may be used to determine if one of the receiver chains (RX) may be turned on or off, that is, whether to enable or disable one (or more) of the RX chains.

One exemplary embodiment of filter 442, and the coefficients/values that may be implemented by the exemplary embodiment of filter 442 is provided below.

$$y(n)=(1-\alpha(n))y(n-1)+\alpha(n)x(n), \quad (1)$$

where x(n) and y(n) are the input and output, respectively, of filter 442 at packet n. α(n) is the filter coefficient for packet n, and depends on the inter-packet arrival time 444, that is, the time that elapses between reception of packet n and reception of packet n−1 (this time duration or time period is represented by "τn"). For example, considering y(1)=x(1), the following values may be used to keep the filter time constant at a value of 1:
   if τn<10 ms, $\alpha(n)=\frac{1}{128}$
   if 10 ms<τn<20 ms, $\alpha(n)=\frac{1}{64}$
   if 20 ms<τn<40 ms, $\alpha(n)=\frac{1}{32}$
   if 40 ms<τn<80 ms, $\alpha(n)=\frac{1}{16}$
   if 80 ms<τn<160 ms, $\alpha(n)=\frac{1}{8}$
   if 160 ms<τn<320 ms, $\alpha(n)=\frac{1}{4}$
   if 320 ms<τn<1 s, $\alpha(n)=\frac{1}{2}$
   if 1 s<τn, $\alpha(n)=1$.
Threshold T may also be adapted to τn, e.g., 10 dB for τn<100 ms, and 15 dB for τn>100 ms. Further details regarding filter adaptation for adaptive TX antenna are detailed in the next section below.

It should also be noted that while exemplary embodiments herein include two RX chains, other embodiments may include additional RX chains and corresponding (or associated) antennas, and any RX chain that remains in operation may be considered an active RX chain while RX chains that have been deactivated may be considered inactive RX chains. Turning an RX chain on and turning an RX chain off may therefore also refer to activating/enabling the RX chain and deactivating/disabling the RX chain, respectively.

Figure 11:
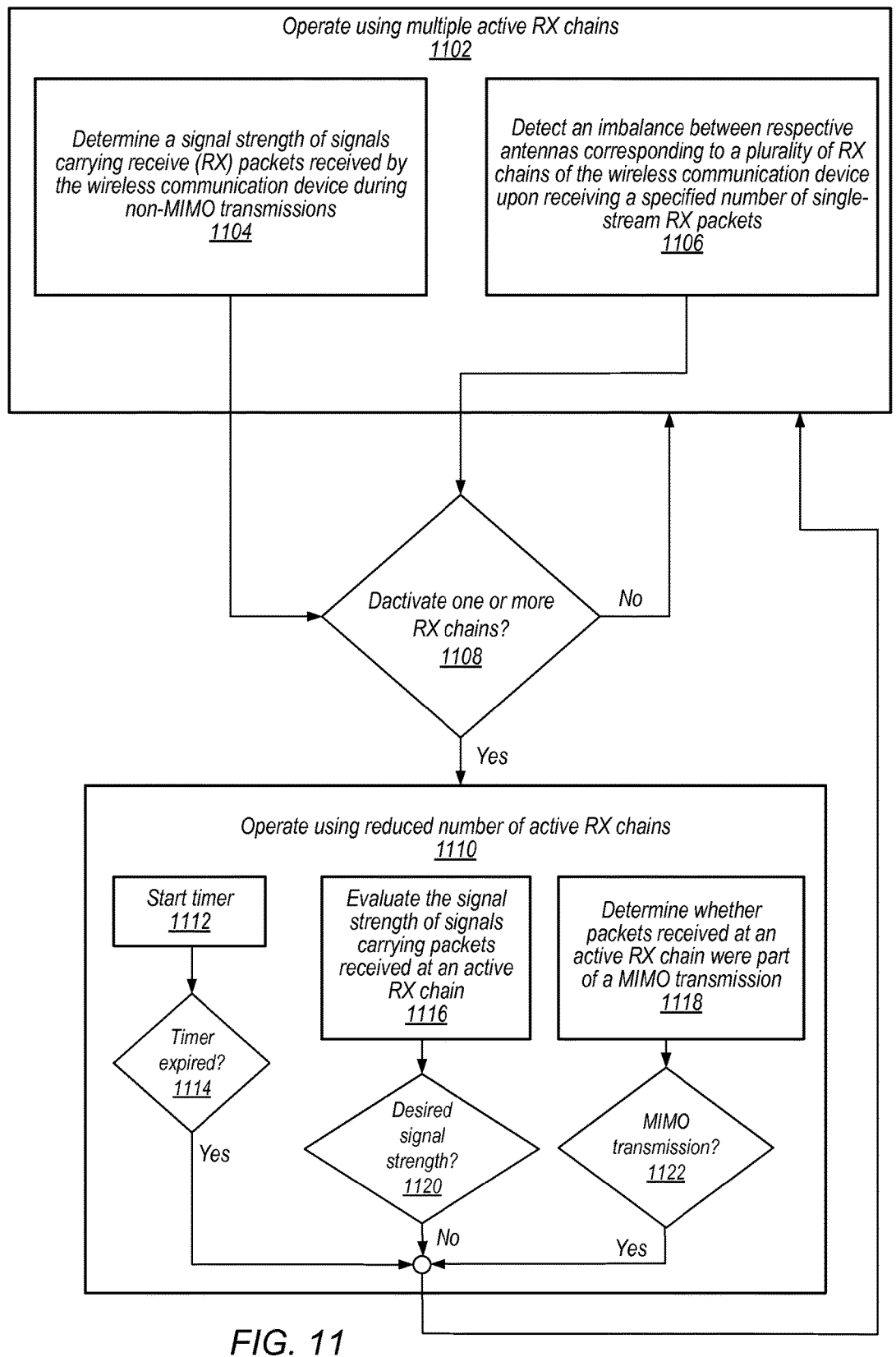
FIG. 11 shows a flow diagram of an exemplary method for performing wireless communications during which one or more receive (RX) paths are deactivated and reactivated, according to some embodiments.

FIG. 11—Exemplary Method for Enabling and Disabling RX Chains During Wi-Fi Communications FIG. 11 shows a flow diagram of an exemplary method for activating and deactivating receive (RX) chains during wireless communications, for example during Wi-Fi communications. As shown in FIG. 11, a wireless communication device may operate using multiple active RX chains (1102). While operating using multiple active RX chains, the wireless communication device may determine a signal strength of signals carrying RX packets received by the wireless communication device during non-MIMO transmissions (1104). The wireless communication device may also detect an imbalance between respective antennas corresponding to a plurality of RX chains in the wireless communication device upon receiving a specified number of single-stream RX packets (1106). Based on the determination (1104) and detection (1106) the wireless communication device may determine whether to deactivate one or more RX chains (1108). If the decision at 1108 is to deactivate one or more RX chains ("Yes" branch taken), the wireless communication device may deactivate one or more RX chains and proceed to operate using a reduced number of active RX chains (1110).

While operating using a reduced number of active RX chains, a timer may be started (1112), and upon expiration of the timer ("Yes" branch at 1114) the wireless communication device may return to operating using multiple active RX chains (1102). The wireless communication device may also operate to evaluate the signal strength of signals carrying packets received at an active RX chain of the wireless communication device (1116). If the signal strength is not at a desired level ("No" branch at 1120), the wireless communication device may return to operating using multiple active RX chains (1102). In addition, the wireless communication device may also determine whether packets received at an active RX chain of the wireless communication device were part of a MIMO transmission (1118), and if the packets indicate a MIMO transmission ("Yes" branch at 1122), the wireless communication device may again return to operating using multiple active RX chains (1102).

Wi-Fi Adaptive TX Antenna Selection

Referring again to FIG. 4, the respective antenna gains of the two antennas Ant0 and Ant1 may not be equal to each other, and the difference between the respective gains may also change due to the environment, conductive materials coming into contact with the antennas, or due to a variety of other factors. At the receiver side, RF (radio frequency) streams from both antennas may be used for receiver diversity. At the transmitter side (TX side), in some cases it may be beneficial to select the better antenna to obtain better performance, for example in embodiments that include only a single TX chain. Thus, for example in a Wi-Fi system having at least two RX chains and at least one TX chain co-located with one of the RX chains, there is a choice of which antenna to select for use with the TX chain to transmit. Adaptive TX antenna selection as further described below may be performed independently of whether adaptive receiver diversity as described above is being performed. In some embodiments, adaptive TX antenna selection may be used together with adaptive receiver diversity for further improved performance and power savings. Alternatively, adaptive TX antenna selection may be used without adaptive receiver diversity, and/or adaptive receiver diversity may be used without adaptive TX antenna selection.

Antenna gain performance is typically not fixed or static. That is, antenna gain performance typically varies during operation. As mentioned above, the gain performance may change as a result of a change in environmental factors (e.g. interference) or physical factors (e.g. conductive materials such as a hand coming into contact with the antenna), as well as some other factors. Furthermore, even if the antenna gain itself does not change, performance may be affected by other environmental factors, such as fading. All of the above may cause an overall gain in one RX chain to differ from an overall gain in the other RX chain from time to time.

It may therefore be desirable to select the antenna which would provide the best performance for the TX chain (e.g. TX0 402 in FIG. 4). In some embodiments, selection of the antenna may be performed based on RX performance. The two (or multiple) RX chains may be monitored to ascertain performance when transmitting using a first antenna (e.g. antenna 337 in FIG. 3) vs. transmitting using a second antenna (e.g. antenna 338 in FIG. 3). Since Wi-Fi is a TDD (Time Division Duplex) system, it may take advantage of the reciprocity of cell conditions being the same during TX and RX. That is, TX performance may be predicted on a per-antenna basis, based on the individual RX performance of both antennas.

FIG. 7—Short Term Fading and Antenna Gain

FIG. 7 illustrates short term fading and antenna gain associated with two RX chains, according to some embodiments. The RSSI is plotted on the Y-axis with respect to elapsed time represented by the X-axis. It should be noted that the instantaneous channel gain of RX0 (illustrated by curve 450) is generally higher than that of RX1 (illustrated by curve 454). However, at certain times the instantaneous channel gain of RX1 may be higher than that of RX0, for example due to short term fading. As illustrated in FIG. 7, in this instance the average gain of RX0 (illustrated by line 452) is higher than the average gain of RX1 (illustrated by line 456), with a gain difference of about 10 dB. Antenna gain difference may be measured by filtering out the short term fading. All received signals, Wi-Fi packets or other co-channel interference may be used to measure relative antenna performance. Packets received from the AP may be used to measure the short term fading likely experienced by immediate transmissions.

FIG. 7 may be considered a snapshot of total-channel-class-antenna-gain tracking channel-gain-performance. There is an average 10 dB gain difference, but instantaneous changes may be in opposite direction from the average trend, as shown in circled portion 458, for example. The reciprocity between the TX channel and RX channel allows for consideration of antenna performance for signal transmission to follow/match antenna performance observed during signal reception. For example, certain antenna performance observed on the receive side (including the circled portion 458) may be expected to be the same or very similar—within a specified time delay from having received an RX packet—on the transmit side. If quick switching is possible, then it may be possible to track the actual fading (which typically changes fairly quickly). If, on the other hand quick switching is not possible, it may be more desirable to choose the antenna with the higher average performance.

It may be ascertained whether fading may be followed (i.e. whether the switching between antennas may be performed fast enough). Fading Doppler, or fading variation in Wi-Fi is typically slower than in many other TDD systems. For example, when transmitting a packet/signal a specified time period (e.g. 5 ms) after having received a packet/signal, channel conditions similar to those observed during the receive cycle may also be observed during the transmit cycle. In FDD (frequency division duplex) systems, the RX chain cannot be used to predict the fading characteristics on the TX chain, whereas in certain TDD systems (such as Wi-Fi) such a prediction is possible.

Figure 9:
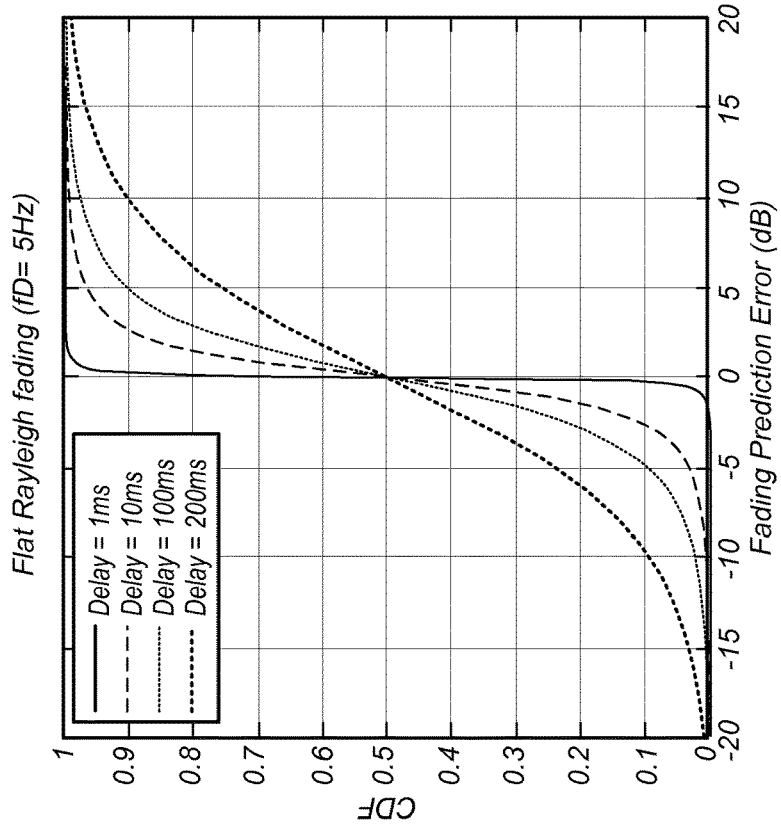
FIG. 9 shows an exemplary diagram illustrating the CDF for fading prediction error for an antenna in one of the worst case conditions in a Wi-Fi channel, according to some embodiments.
Figure 8:
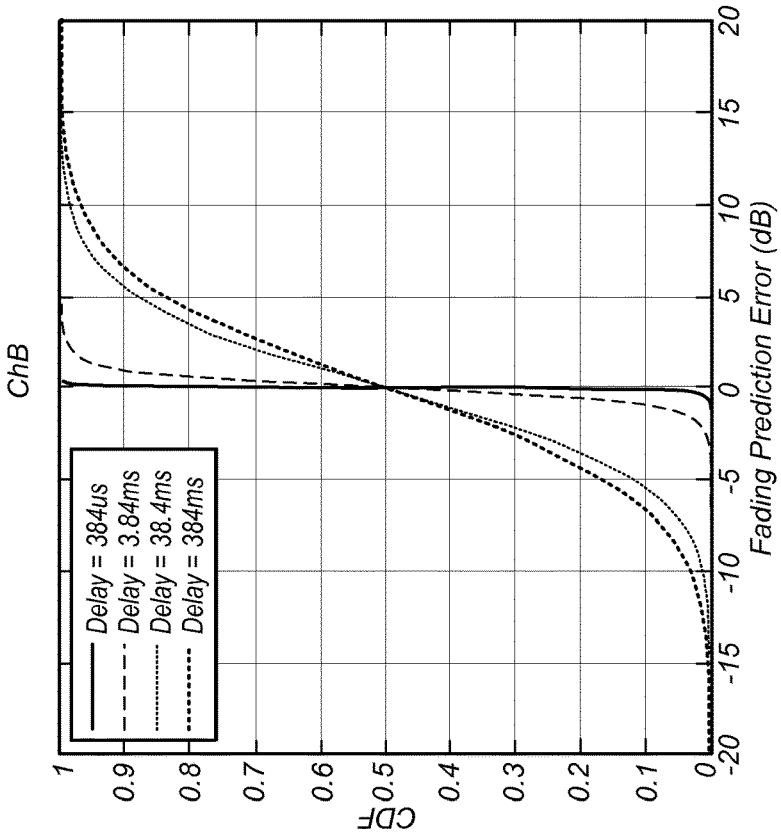
FIG. 8 shows an exemplary diagram illustrating the cumulative distribution function (CDF) for fading prediction error for an antenna in a typical Wi-Fi channel, according to some embodiments.

FIGS. 8 and 9—Fading Prediction

FIG. 8 shows a diagram illustrating the cumulative distribution function (CDF) for fading prediction error for an antenna in a typical Wi-Fi channel (labeled ChB). As seen in FIG. 8, the CDF is represented on the Y-axis, and is plotted versus the fading prediction error (in dB) represented on the X-axis. As previously mentioned, Wi-Fi is a TDD system where signal transmission and signal reception share the same frequency band, and hence the UL (TX) and DL (RX) channels are reciprocal. Based on reciprocity, the UE may predict TX channel fading based on RX channel fading as long as transmission is within coherence time of the fading channel. Coherence time represents the time duration over which the channel impulse response is considered to not be changing or varying. As seen in FIG. 8, when transmitting a packet 384 μs after receiving a packet, the difference between channel conditions experienced by the RX packet and the TX packet is fairly small, or at most a specified value deemed acceptable. As the time delay between data reception and data transmission grows, the fading prediction error grows along with it, making it more difficult to accurately predict the channel conditions. In order to make use of the benefit that TDD allows in making decisions regarding antenna switching for data packet transmission based on analysis that uses received data packets, packet transmission is expected to take place within a certain time window of packet reception. Thus, the TDD structure may be exploited within specific time windows.

FIG. 9 shows a diagram illustrating the CDF for fading prediction error for an antenna in one of the worst case conditions in a Wi-Fi channel. The Flat Rayleigh fading curves in FIG. 9 represent one of the worst case conditions for fading error prediction (vs. ChB which is typical Wi-Fi channel model). As observed in FIG. 9, the fading prediction error begins deviating significantly as the time window between when packets are received and when packets are transmitted takes on larger values (beginning at 1 ms) and increases. When it is not possible to transmit packets within the required time window, a viable alternative decision making process may be employed based on long term average antenna gain, as will be further described below.

Long Term Antenna Gain

In one set of embodiments, a filter may be utilized to filter out short term fading in order to evaluate the long term antenna gain difference. The long term antenna gain difference may be measured over a first time interval many times longer than a second time interval over which short term, e.g. instant variations in fading are measured. For example, in some embodiments, the first time interval may be tens, hundreds, or more times longer than the second time interval. In this manner the (long term) imbalance between the respective gains of the different antennas may be evaluated. Because the relative gain difference is evaluated, all received packets may be used for this evaluation. Overall, then, the RX channel (and any antenna(s) associated with the RX channel) with better average gain may be selected. While in cellular communications the signal strength may be measured based on a regularly transmitted reference signal or periodic beacon/pilot signal, no such signal is transmitted in Wi-Fi. Consequently, for Wi-Fi communications signal strength may be measured during packet transmissions. Measurements may be made based on either the preamble or the packet. When exploiting reciprocity for instant fading, e.g. short term fading detection/prediction, RX packets used for (signal) measurements may originate from the AP to which the packets are intended to be transmitted during TX cycles. In other words, the transmission of the RX packets on which the signal measurements are based may be received from the AP with which the UE communicates.

Figure 10:
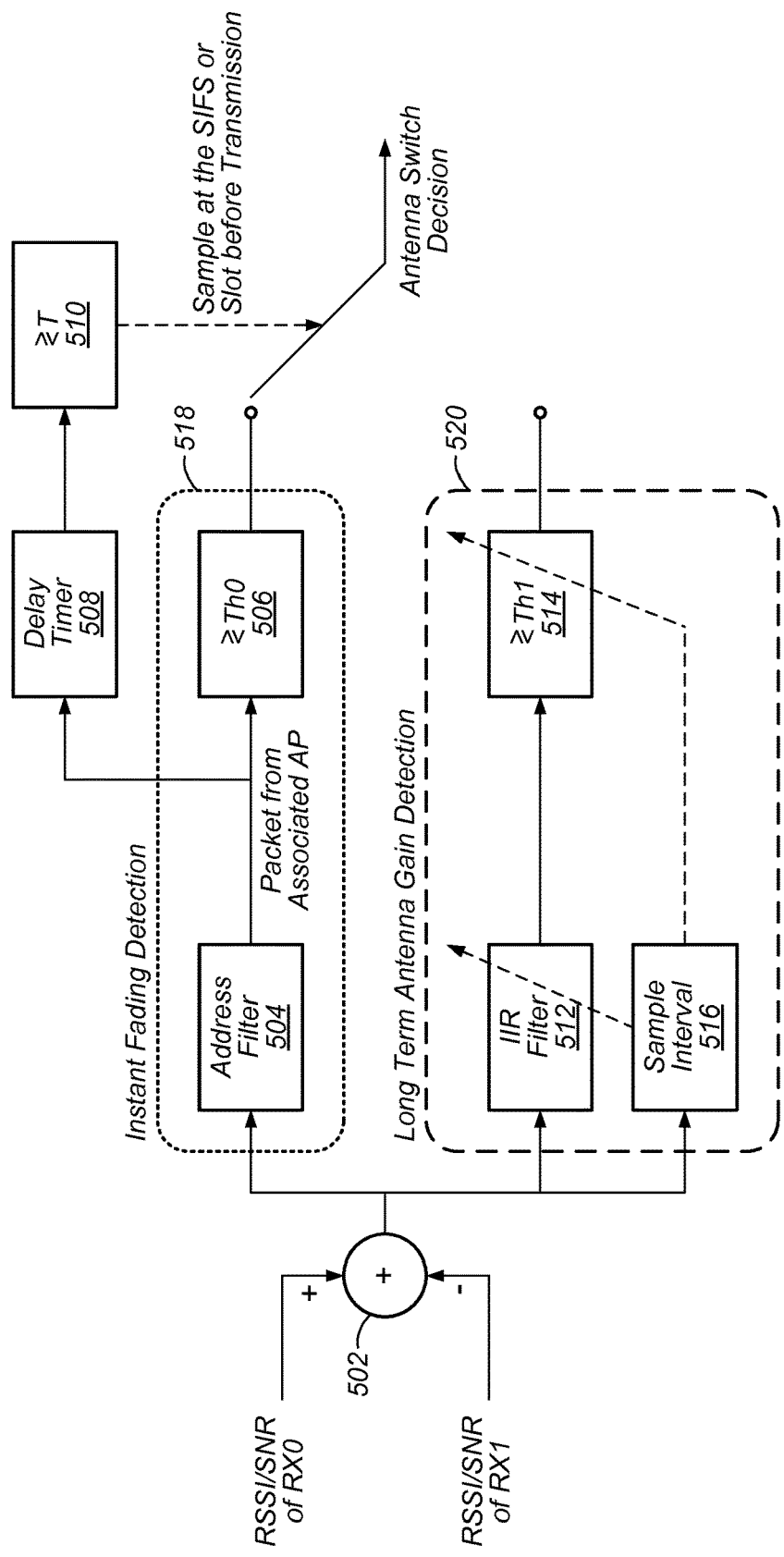
FIG. 10 shows an exemplary control system for switching between antennas, according to some embodiments.

When performing long term antenna gain detection/prediction, the source of the packets is of no importance, in contrast to the instant fading case. It doesn't matter where the packets are transmitted from, since they are all received through the same antenna, and therefore all will be experiencing the same antenna gain. In other words, when performing the evaluations for long term antenna gain, all received packets may be used. Which evaluation method to choose (i.e. instant fading or long term antenna gain) may be determined based on at least the delay timer. As shown in FIG. 10 (and as will be further discussed in more detail below), the delay timer 508 may track the time that has elapsed since the last packet was received from the associated AP.

In one set of embodiments, an antenna switching control system may use an IIR filter as shown in FIG. 6 (and as also used for adaptive RX diversity) with adaptive coefficients and an adaptive threshold as follows:

$$y(n)=(1-\alpha(n))y(n-1)+\alpha(n)x(n), \quad (2)$$

where x(n) and y(n) are again the input and output, respectively, of the filter 504 at packet n, and $\alpha(n) \leq 1$ is the filter coefficient for packet n. Coefficient and threshold adaptation may be based on the interval that elapses between the two consecutive filter inputs. Coefficients and threshold may both increase as the input sample interval increases. After a currently selected antenna has been switched to a different antenna, y(n) may be set to −y(n−1).

FIG. 10—Exemplary Antenna Switching Control System

FIG. 10 illustrates an exemplary antenna switching control system, according to some embodiments. As shown in FIG. 10, the antenna switching control system includes an instant fading detection/prediction stage 518 and a long term antenna gain detection/prediction stage 520. Which of the two prediction stages is to be used may be determined during the SIFS (short interframe space, i.e. the time period required for the wireless interface to process a received frame and respond with a response frame) or during a time slot before the transmission. The RSSI/SNR may be measured on the preamble of all packets, and input to node 502, from where the difference values may be provided to all filter branches (address filter 504 and IIR filter 512), as well as into sample interval detection 516. However, the instant fading detection stage 518 may only use the measurements on packets from the associated AP to exploit the reciprocity for future transmission. At the switching occasion (which, as previously mentioned, may occur during the SIFS or during a time slot before transmission), if the instant fading detection is based on a packet received no later than a specified time period T before the intended transmit time (as determined at 510), then the information (output) provided by the instant fading detection/prediction stage 518 may be used. Otherwise, the information (output) provided by the long term antenna gain detection/prediction stage 520 may be used.

In one set of embodiments, the witching decision of the instant fading detection may be based on the threshold Th0=Prediction error margin+ΔANT (detected at 506). E.g., when the prediction error margin is 3 dB, the gain difference (ΔANT) between antenna 1 (ANT0) and antenna 2 (ANT1) may be determined as follows:

$$\Delta ANT = ANT0 TX\ gain - ANT0 RX\ gain - ANT1 TX\ gain + ANT1 RX\ gain, \quad (3)$$

when ANT0 is connected to (is associated with) RX0, and ANT1 is connected to (associated with) RX1.

Switching decision of the long term antenna gain detection may be based on the threshold Th1=ΔTh+ΔANT where ΔTh is adapted to the sample interval (as detected at 514). It should be noted that as used in FIG. 10, "switching decision" or "antenna switch decision" refers to whether or not to switch between antennas. In other words, in the control system of FIG. 10, two decisions are made. One is the decision of which output, the one from stage 518 or the one from stage 520 to use, and the other is whether the selected output indicates that the antenna should be switched.

It should be noted that while the fading conditions may be reciprocal, there may be some offset between the transmission performance and the reception performance of the antenna that can be accounted for per antenna. Furthermore, regarding the sample interval adjustment 516, one goal may be to try and maintain a fixed IIR filter time constant. Because of the equally spaced beacon/pilot signals in cellular implementations, it may be more feasible to maintain a fixed time constant for the IIR filter in cellular implementations. In contrast, in the case of Wi-Fi communications, packets are received at varying times, and it may become more challenging to maintain a fixed time constant in the filter. Thus, the weighting may be changed according to the time spacing between the various packets. For example, if the spacing between the received packets is small, the weighting may be changed appropriately to help maintain a fixed time constant. Accordingly, a different threshold may also be used for determining when to switch antennas.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless communication device comprising:
a plurality of antennas configured to transmit and receive signals;
a plurality of receive (RX) chains, each RX chain corresponding to a respective antenna of the plurality of antennas and configured to receive signals from the respective antenna; and
a processing element configured to interoperate with the plurality of RX chains to cause the wireless communication device to:
determine a signal strength of signals carrying RX packets received during non-MIMO (non-multiple-input-multiple-output) transmissions;
detect whether a gain imbalance exists between respective antennas of the plurality of antennas, upon receiving a specified number of single-stream RX packets; and
determine whether or not to deactivate one or more RX chains of the plurality of RX chains, responsive to at least one of the following:
results of the signal strength determination; and
results of the gain imbalance detection.

2. The wireless communication device of claim 1, wherein the processing element is configured to interoperate with the plurality of RX chains to further cause the wireless communication device to:
start a timer when deactivating an RX chain of the plurality of RX chains; and
reactivate the RX chain upon expiration of the timer.

3. The wireless communication device of claim 1, wherein the processing element is configured to interoperate with the plurality of RX chains to further cause the wireless communication device to:
evaluate a signal strength of signals carrying packets received at an active RX chain of the plurality of RX chains; and
reactivate one or more deactivated RX chains of the plurality of RX chains responsive to results of the evaluation of the signal strength.

4. The wireless communication device of claim 1, wherein the processing element is configured to interoperate with the plurality of RX chains to further cause the wireless communication device to:
detect when packets received at an active RX chain of the plurality of RX chains are part of a MIMO transmission; and
reactivate one or more deactivated RX chains of the plurality of RX chains responsive to results of the detection of the MIMO transmission.

5. The wireless communication device of claim 1, wherein the processing element is configured to interoperate with the plurality of RX chains to further cause the wireless communication device to:
base the determination of the signal strength of the signals carrying RX packets received by the wireless communication device during non-MIMO transmissions on packets received from an associated access point device to which the wireless communication device also transmits packets.

6. The wireless communication device of claim 1, wherein the processing element is configured to interoperate with the plurality of RX chains to further cause the wireless communication device to:
  perform the gain imbalance detection using an infinite impulse response (IIR) filter.

7. The wireless communication device of claim 6, wherein the processing element is configured to interoperate with the plurality of RX chains to further cause the wireless communication device to:
  keep a filter time coefficient of the IIR filter constant.

8. The wireless communication device of claim 1, wherein the processing element is configured to interoperate with the plurality of RX chains to further cause the wireless communication device to:
  upon transitioning to a state in which a single RX chain of the plurality of RX chains remains active, transmit explicit signaling to an access point device from which the wireless communication device has been receiving RX packets;
  wherein the explicit signaling indicates to the access point device that the wireless communication device only supports single-input single-output transmissions.

9. An apparatus comprising:
  a processing element configured to:
    determine a signal strength of signals carrying RX packets received during non-MIMO (non-multiple-input-multiple-output) transmissions;
    detect whether a gain imbalance exists between respective antennas of a plurality of antennas, upon receiving a specified number of single-stream RX packets; and
    determine whether or not to deactivate one or more RX chains of a plurality of RX chains, responsive to at least one of the following:
      results of the signal strength determination; and
      results of the gain imbalance detection.

10. The apparatus of claim 9, wherein the processing element is further configured to:
  start a timer when deactivating an RX chain of the plurality of RX chains; and
  reactivate the RX chain upon expiration of the timer.

11. The apparatus of claim 9, wherein the processing element is further configured to:
  evaluate a signal strength of signals carrying packets received at an active RX chain of the plurality of RX chains; and
  reactivate one or more deactivated RX chains of the plurality of RX chains responsive to results of the evaluation of the signal strength.

12. The apparatus of claim 9, wherein the processing element is further configured to:
  detect when packets received at an active RX chain of the plurality of RX chains are part of a MIMO transmission; and
  reactivate one or more deactivated RX chains of the plurality of RX chains responsive to results of the detection of the MIMO transmission.

13. The apparatus of claim 9, wherein the processing element is further configured to:
  base the determination of the signal strength of the signals carrying RX packets received during non-MIMO transmissions on packets received from an associated access point device to which packets are transmitted.

14. The apparatus of claim 9, wherein the processing element is further configured to:
  perform the gain imbalance detection using an infinite impulse response (IIR) filter; and
  keep a filter time coefficient of the IIR filter constant.

15. The apparatus of claim 9, wherein the processing element is further configured to:
  when a single RX chain of the plurality of RX chains remains active, cause explicit signaling to be transmitted to an access point device from which RX packets are received;
  wherein the explicit signaling indicates to the access point device that only single-input single-output transmissions are supported.

16. A non-transitory memory device storing instructions executable by a processing element to:
  cause a plurality of receive (RX) chains of a wireless communication device to receive signals from a plurality of antennas of the wireless communication device, each RX chain of the plurality of RX chains corresponding to a respective antenna of the plurality of antennas and receiving signals from the respective antenna;
  determine a signal strength of signals carrying RX packets received by the plurality of RX chains during non-MIMO (non-multiple-input-multiple-output) transmissions;
  detect, once the wireless communication device has received a specified number of single-stream RX packets, whether a gain imbalance exists between the respective antennas of the plurality of antennas; and
  determine whether or not to deactivate one or more RX chains of the plurality of RX chains, responsive to at least one of the following:
    results of the signal strength determination; and
    results of the gain imbalance detection.

17. The non-transitory memory device of claim 16, wherein the instructions are executable by the processing element to:
  start a timer when deactivating an RX chain of the plurality of RX chains; and
  reactivate the RX chain upon expiration of the timer.

18. The non-transitory memory device of claim 16, wherein the instructions are executable by the processing element to:
  evaluate a signal strength of signals carrying packets received at an active RX chain of the plurality of RX chains; and
  reactivate one or more deactivated RX chains of the plurality of RX chains responsive to results of the evaluation of the signal strength.

19. The non-transitory memory device of claim 16, wherein the instructions are executable by the processing element to:
  detect when packets received at an active RX chain of the plurality of RX chains are part of a MIMO transmission; and
  reactivate one or more deactivated RX chains of the plurality of RX chains responsive to results of the detection of the MIMO transmission.

20. The non-transitory memory device of claim 16, wherein the instructions are executable by the processing element to:
  when a single RX chain of the plurality of RX chains remains active, cause explicit signaling to be transmitted to an access point device from which the wireless communication device receives RX packets;

wherein the explicit signaling indicates to the access point device that only single-input single-output transmissions are supported by the wireless communication device.

* * * * *